June 23, 1970          G. W. MATSON          3,516,941

MICROCAPSULES AND PROCESS OF MAKING

Filed July 25, 1966

INVENTOR.
GALE W. MATSON
BY
Carpenter, Kinney & Boulter
ATTORNEYS

United States Patent Office 3,516,941
Patented June 23, 1970

3,516,941
MICROCAPSULES AND PROCESS OF MAKING
Gale W. Matson, Minneapolis, Minn., assignor to Minnesota Mining & Manufacturing Company, St. Paul, Minn., a corporation of Delaware
Continuation-in-part of application Ser. No. 175,394, Feb. 26, 1962. This application July 25, 1966, Ser. No. 567,723
Int. Cl. B01j *13/02*
U.S. Cl. 252—316    9 Claims

ABSTRACT OF THE DISCLOSURE

Microcapsules are provided, each comprising an organic liquid fill enclosed by a strong, impermeable shell of urea-formaldehyde polymer. The microcapsules are produced by dispersing and maintaining the fill material as finely-divided particles in an aqueous, water-soluble urea-formaldehyde precondensate solution substantially free of carboxymethylcellulose and other wetting agents while polymerizing the precondensate by acid-catalysts for at least one hour in a pH range of about 1 to about 5. The microcapsules are particularly adapted for their incorporation, either as coatings on or as inclusions within, papers and other sheet materials.

---

This application is a continuation-in-part of my co-pending application Ser. No. 175,394, filed Feb. 26, 1962, now abandoned, and also a continuation-in-part of my application Ser. No. 95,417 filed Mar. 13, 1961, now abandoned.

This invention relates to small capsules, each comprising a synthetic resin or plastic shell wall, especially an aminoplast shell wall, enclosing a fill particle, usually a liquid droplet, therewithin and to methods for producing them. A discussion of aminoplasts and aminoplast precursors appears in C. P. Vale's book "Aminoplasts," published in 1950 by Interscience Publishers, Inc.

The capsules of the invention are generally more or less spherically or spheroidally shaped discrete bodies. Ordinarily, they have diameters ranging from about 1 to 2000 microns (0.001 to 2 mm.), and more frequently within the range of about 1 to 500 microns (0.001 to 0.5 mm.). These capsules are each composed of an outer continuous self-supporting shell wall of water-insoluble synthetic plastic, e.g. aminoplast polymer, surrounding an inner fill particle. In general, the fill material in each capsule comprises from about 50 to 95 weight percent of the capsule with the shell making up the remaining 50 to 5 weight percent; although the quantity of fill may be as little as 20 weight percent, or less, in the more extreme ranges of the invention. These capsules have a very wide variety of uses, such as carriers for fuels, waxes, dyes, reactive materials, oils, agricultural chemicals, insecticides, etc. The capsules can be used directly as made, or indirectly by incorporating them into other products. A major area of use of these capsules, and one where their characteristics are especially important, is in carbonless papers where a visible image is created on the paper by impact of a business machine key or upon pressure from a stylus.

The general art of making microcapsules of some character has long been known. By far the best known prior procedures are those for making microcapsules from gelatin, both by simple precipitation processes, e.g. Taylor Pat. No. 2,183,053, and by more complex precipitation processes involving solution equilibrium conditions such as those described by Bungenberg De Jong and co-workers in various publications, e.g. Biochemische-Zeitschrift 1931, 232, 338–345 and more generally in the book Colloid Science, vol. II, "Reversible Systems," edited by H. R. Kruyt, published in 1949 by Elsevier Publishing Company, Inc., New York, N.Y., and in patents such as 2,800,-457, and 2,800,458 to B. K. Green, issued July 23, 1957. Further developments of the gelatin encapsulating procedures have proven adequate in the formation of very small microcapsules, e.g. 2–50 microns containing certain types of fill; and the resulting gelatin capsules have proven useful as coatings for carbonless impact marking papers of the transfer or couplet type wherein the capsules are carried on one sheet of paper and the reactants for the capsule contents are carried on a mating sheet of paper. Large quantities of such impact paper, of the transfer type, have been made and sold. However, these capsules have been found to be commercially unsatisfactory in self-contained impact marking papers, i.e. those papers where the capsules and the reactants for the capsule contents are carried by the same sheet of paper for reaction with one another to produce a mark on that sheet of paper. Gelatin being a natural polymer, quality control thereof is a constant and plaguing problem. Because gelatin is a gellable hydrophilic colloid, gelatin capsules tend to agglomerate and become glutenous so that production of dry free-flowing capslues of gelatin cannot be accomplished by simple filtration. Also, because gelatin is an already formed polymer, control of capsule shell properties becomes difficult.

Other encapsulation processes have been suggested wherein a preformed synthetic polymer is draped around a particle to form a capsule. Examples of such procedures are found in Pat. No. 2,766,478 to Raley, issued Oct. 16, 1956, and Pat. No. 3,015,128 to Somerville issued Jan. 2, 1962. However, these procedures lead to the formation of capsules of fairly large micron sizes, for example, above 100 microns, and thus are not suitable for use in one of the major areas of utility now known for this kind of packaging medium, namely the making of impact marking transfer and self-contained papers, wherein capsules of sizes averaging below 25 microns are required, the effective capsule size average being usually in the range of 5 to 20 microns.

Formation of capsules by chemical reaction to form a shell material around a droplet or particle has also been proposed. Thus, it is proposed in Pat. No. 2,581,441 to Raab, issued Jan. 8, 1952, to chemically convert a normally water-soluble algin to a water-insoluble algin which then comprises the capsule shell. Pat. No. 3,016,308 to Macaulay, issued Jan. 9, 1962, described a capsule making procedure involving the preparation of a stable aqueous emulsion of a non-volatile capsule fill, and usually of the shell forming material as well. Capsule formation is generally accomplished by spray drying of the resulting emulsion. However, Example IV of that patent describes shell formation by acid catalyzed urea-formaldehyde polymerization of an emulsion stabilized with a wetting agent, viz. carboxy methyl cellulose. The presence of the wetting agent and the absence of any polymerization controls, however, results in capsules having inferior properties and no known commercial utility. In Pat. No. 3,137,631 to Soloway, issued June 16, 1964, and in its abandoned predecessor application, still other procedures for forming capsules involving urea-formaldehyde are suggested. However, to the best of my knowledge, none of these prior suggestions has led to any commercially useful product.

There are many reasons why forming a shell around a particle such as an oil droplet by aldehyde condensation polymerization is desirable. Quality control of raw materials, such materials being ordinarily readily synthesized, is relatively easily maintained, as compared with gelatin. The polymer precursors for aldehyde condensation polymer formation are usually completely soluble in aqueous solution and become insoluble upon further condensation polymerization, whereupon they precipitate readily out of aqueous solution. However, insofar as I am aware, it was not possible prior to my invention thereof to produce aldehyde condensation polymer shelled microcapsules of sufficient toughness and/ or impermeability for any really practical utility.

Aminoplast polymers, and particularly urea-formaldehyde plastics, may be used in many different ways, in an effort to encapsulate oily fill material, with no useful results or indifferent results. However, I have found that if certain controls are exercised, and adhered to, as illustrated in examples presented hereinafter, it is possible to attain highly useful capsules. This result is especially impressive in the size range of 50 microns and less, e.g. about 5 to 25 microns, more or less. Capsules thus made according to this invention have had extensive commercial use, in self-contained impact papers, since about June 1962; and, in such use and combination, have demonstrated their toughness, impermeability, and general superiority. These capsules are of sufficient toughness and impermeability to carry non-aqueous solutions of dye precursors, in contact with aqueous media containing color forming reactants for said dye precursors, without premature rupture or leakage. The capsules and co-reactants can be applied in intimate contact with one another, as one or more surface coatings on a paper or the like, and stored under normal handling conditions for months and even years without premature capsule rupture. Further, these capsules can stand the rigors of paper formation on a paper machine and can be directly incorporated into a paper furnish in the formation of papers having the capsules carried as a filler therewithin, which papers can be formed on the machine and thereafter dried, wound on rolls, slit, printed, stacked and stored without significant premature capsule rupture while yet the capsules remain readily rupturable upon normal impact of a business machine key or stylus pressure. Until the advent of these new capsules no such impact papers could be made.

In accordance with this invention microencapsulation of water-insoluble fill material within a water-insoluble non-thermoplastic synthetic resin of the aminoplast type is accomplished by providing (1) an aqueous solution of a water-soluble, low-molecular-weight urea-aldehyde precondensate comprising predominantly low molecular weight reaction products of urea and formaldehyde, e.g. dimethylol urea, the solution having a solids content of about 3% to 30% by weight of the total aqueous precondensate, and into which is incorporated (2) water-insoluble fill material in an amount in parts by weight of about one-tenth of a part to about ten parts of fill material for each part solids in the precondensate, (3) dispersing the fill material as microscopically sized discrete particles in the solution in the substantial absence of wetting agents, and while continuing to maintain said fill material in particulate form and maintaining the resultant dispersion at a temperature of about 10° C. to 50° C., (4) adding acid thereto in an amount to provide a pH for the dispersion in the range of about 1 to 5.0 and more practically about 1.5 to 3 or 3.5, thereby promoting acid catalysis of the precondensate, (5) continuing polymerization of the precondensate to a water-insoluble urea-formaldehyde polymer while maintaining the fill material as finely dispersed particles, viz. by rapid agitation within a temperature range of about 20° C. to 90° C. for at least about one hour, whereupon an aqueous slurry of capsules is provided wherein said fill particles are encapsulated within tough water-insoluble, urea-formaldehyde polymer shells. The resulting microcapsule slurry may then be neutralized and stored or used in slurry form; or the capsules may be separated by simple filtration, dried and used in dry, free-flowing form.

Microcapsules made in accordance with this invention are illustrated in the accompanying drawing wherein.

Figure 1:
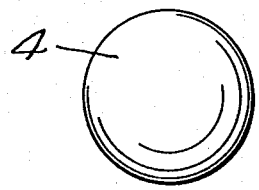
FIG. 1 is a view on a greatly enlarged scale of a microcapsule.
Figure 2:
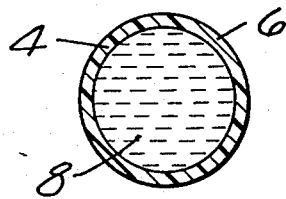
FIG. 2 is a cross-sectional view of the microcapsule of FIG. 1.

The microcapsule of FIGS. 1 and 2 is designated in its entirety by the numeral 4. It comprises an aminoplast shell 6 having a fill 8 therewithin.

Aminoplast polymer capsule shells useful in the practice of this invention are those which comprise predominantly reaction products of urea and formaldehyde and which are capable of polymerization from a water-soluble pre-polymer state under acid conditions in aqueous media (i.e. at a pH less than 7) to form substantially water-insoluble polymers. The water-soluble prepolymers are generally made by reacting urea and formaldehyde in an equivalent weight ratio of 0.6 to 1.3 parts of formaldehyde to 1 part of urea, and preferably in a weight ratio of about 1 part of formaldehyde to 1 part of urea. This is a mole ratio of about 1.2 to 2.6 parts of formaldehyde to one part of urea, and preferably a mole ratio of about 2:1. Thiourea, cyanuramide (melamine), guanidine, N-alkyl ureas, phenols, sulfonamides, anilines, amines and the like can be included as modifiers for the urea. When modifiers are used, they should be used to replace no more than about 25% of the urea and preferably to replace no more than 10% of the urea, the percentage being calculated on an equivalent weight basis.

Suitable water soluble urea-aldehyde prepolymers for use in the practice of this invention are commercially available for use as adhesives, as for example, the "Urac" 110, 180 and 186, resins; the latter two are marketed by American Cyanamid as 66% and 60% solids, respectively, in aqueous solution, "Urac" 110 resin is available as a water dissolvable solid.

Superior capsules are made from urea-formaldehyde prepolymers or precondensates prepared by the alkaline catalyzed reaction of urea and formaldehyde in water under carefully controlled conditions. Preferred conditions for the preparation of these prepolymers are pH values in the range of from about 7.5 to 11.0, temperatures of from about 50 to 90° C., and reaction times of from about fifteen minutes to 3 hours or longer in aqueous media, the higher the temperature, the less the time. Since formaldehyde is commonly available as formalin, which is a 37% solution of formaldehyde in water, usually stablized with a small amount of methanol, it is convenient to simply add urea to formalin in the preparation of the water-soluble precondensate. The precondensate can be made at room temperature but the time required for proper precondensate formation is erratic, e.g. from 4 to 24 hours until a predominantly dimethylol urea product results.

When the concentration of the precondensate at the time of acid addition is more than about 30 weight percent reactive solids, excessive viscosity may result, and, if less than about 3 weight percent solids, the resulting capsules may be too weak and the economics of the encapsulation process decline. A preferable range of precondensate concentration in the aqueous medium, for producing superior capsules, is from about 10 to 25 weight percent solids.

In general, the microcapsule fill can be liquid, solid or gaseous, so long as it is relatively insoluble (less than 5 or 10%) in the system and inert toward reaction with other ingredients in the system; particularly the fill material should be inert to attack by the polymerization catalyzing acid. It is, however, in the area of liquid droplet filled capsules that my invention appears to have its greatest utility.

For reasons not readily explainable, the addition of about 2 to 20 weight percent, or more, of sodium chloride, or other water soluble salt of a strong acid and a strong base inert to the urea-formaldehyde (UF) reaction system, to the precondensate solution results in tougher capsules capable of carrying higher fill content and facilitates capsule formation in the higher pH ranges, e.g. 4 to 5. A preferable range is about 4 to 15 percent salt.

During encapsulation the fill material must be maintained in the form of dispersed particles, usually as oily liquid droplets dispersed in the aqueous phase by vigorous agitation. In general, the more vigorous the agitation, the smaller the capsules produced. However, in the practice of my invention there are other important factors which bear on capsule size control, such as the manner of precondensate preparation, acid addition rate and concentration, reaction temperature, and the type of fill used. The more readily dispersible the oily organic liquid used as the fill, the more readily the smaller capsules, below about 25 microns are formed. Xylene, toluene, cycolhexane, diethyl phthalate, tributyl phosphate and the like are examples of useful oily fills. Solid particles may be dissolved or dispersed in the liquid droplets.

Preferably, the amount, in parts by weight, of fill material based on the reactive precondensate solids (not including the salt) is about 0.7 to 3 parts of fill per 1 part of the precondensate solids, this range providing capsules containing from about 50 to 80% fill and possessing sufficient toughness for normal handling in operations such as paper making. For larger microcapsules or higher density fills or where more ready capsule rupture is desired the ratio may be high as or higher than 10:1, fill to capsule solids, providing capsules with as much as 95% fill. Where a tough relatively unbreakable bead-like capsule is desired and the amount of fill per capsule is not important, less than one-tenth part fill to each part condensate solids can be used to provide capsules.

After the fill material has been dispersed in the precondensate and the agitation rate properly adjusted, condensation polymerization of the urea-aldehyde precondensate may be initiated by the addition of acid to the system. In general, any water-soluble acid can be used, so long as it will maintain the pH in the range of about 1 to 5. Examples of suitable acid catalysts include formic acid, citric acid, para toluene sulfonic acid, hydrochloric acid, sulfuric acid, phosphoric acid, and the like.

When capsule shell formation is begun by acid catalyst addition to the agitated dispersion of fill in precondensate solution, it is observed that the condensation polymerization initially proceeds slowly. In fact, fill can be added after, instead of before, acid addition (but prior to shell formation). The formation of shell walls is perceived within the first hour after the pH is in the range of about 1 to 5. Variations of pH outside of this range result in capsules having generally undesirable properties. For calculating time of polymerization following acid addition, the polymerization leading to capsule formation may be said to begin to run when the pH of the system reaches about 5. Thereafter, it may be adjusted further downward during the polymerization and such adjustment would be part of the total polymerization time. A preferred pH range is from 1.5 to 3.0 to produce tougher, more impermeable capsules. Also, in this range temperature control is easily maintained and capsule reproducibility is excellent. Capsules made at higher pH values than about 4.0 may tend to be weak and too permeable for uses where the capsule forms part of an image-forming chemical reactant, although they are suitable for less exacting uses, e.g. carrying shoe polishes, waxes, perfumes or the like. Below a pH of about 1.5 control of acidity is difficult and the equilibrium of the system may become such that shell wall formation is too rapid for adequate product control, and/or shell formation may be accompanied by polymer degradation.

When capsules of small sizes, e.g. 25 microns and smaller, are desired, the acid should be added to the system slowly over a period of several minutes, usually in increments over a period of about 10 minutes to an hour, and at a temperature in the range of about 20 to 30° C. In a three increment acid addition procedure, capsules of an average size of 5 to 20 microns result if the third increment is withheld for a period of from 30 to 60 minutes or more. Apparently when the reaction mixture containing the oily droplets is subjected to extended high speed agitation at this stage, smaller capsules result. If larger capsules are desired, the acid addition need not be so carefully controlled, and it may even be desirable to add the acid all at once.

After a polymerization period of about one-half hour to one hour following acid addition, the temperature may be raised in the range of 60 to 90° C. to complete the shell formation. The temperature, of course, should not be above the boiling point of either the fill or the precondensate solution. Preferably the reaction should be run for at least about 1 to 3 hours after acid addition at the desired pH range before separating the capsules or neutralizing the resultant slurry and preventing further significant polymerization. While the polymerization may be permitted to run as long as six hours or more, unless the fill is of a nature which prohibits too much temperature rise, e.g. above 40–45° C., no particular advantages are apparent. While tough, generally impermeable capsules are formed after one hour in the lower pH ranges and at the higher temperatures, particularly if salt has been added to the system, as noted heretofore, more consistent capsules are obtained if the polymerization is allowed to proceed the somewhat longer time. Of course, if the temperature is lower than the 60 to 70° C. range, the polymerization time before tough capsule formation is longer.

Addition of the fill material may be made directly to the precondensate solution; however, since this precondensate solution is usually mildly alkaline, it is preferred to adjust the initial pH of the precondensate solution to a neutral or weakly acid state before addition of the fill material.

In the event the capsules are separated from the slurry, they can be dried by conventional drying procedures to a dry free-flowing state. In practice, drying temperatures employed are in the range of about 60° F. to about 350° F., compatible with the fill material.

The determination of the percent of fill in any given capsule product of this invention can be determined by many laboratory means. One method which is used is simply to crush a weighed sample of the capsules and thereafter extract the fill from the crushed samples. The weight loss, or the weight of fill obtained from the extraction solvent by evaporating said solvent, can be used as the basis for determining the relationship between fill weight and shell wall weight. A second method is simply to hydrolyze the shells in concentrated hydrochloric acid and weigh the released fill following its separation from the aqueous acid.

Capsules of urea-formaldehyde condensation polymer shells made in accordance with this invention are surprisingly tough and have been found sufficiently impermeable to retain cyclohexane fill (boiling point of 80° C.) in an oven at atmospheric pressure and 100° C. for 50 hours and longer with no measurable loss of fill.

Heretofore no one, to my knowledge, ever succeeded in making synthetic resin microcapsules of a size range below 50 microns in diameter whose synthetic plastic shell walls were sufficiently impermeable to come anywhere near approaching or providing the impermeability just stated, or even to hold a cyclohexane fill, at atmospheric pressure and 100° C. for even 1 hour without a significant loss of the fill.

Another indication of capsule strength of capsules made according to this invention can be seen from the results obtained by comparing materials before and after encapsulation, using a conventional micro-melting point apparatus or so-called "hot stage" microscope. This particular type of equipment is normally used to determine melting point by application of a slow rise in temperature. For example, carbon tetrachloride (boiling point approximately 76° C.) when encapsulated in a condensation polymer shell of urea and formaldehyde made in accordance with this invention shows a rupture temperature in the neighborhood of 200° C. (slightly below the decomposition temperature of the shell) using this apparatus. Similar phenomena are noted with capsules containing other volatile fills. Again, high shell wall strength of the capsules of this invention is indicated in all instances.

A specific showing of shell wall strength is found in capsules of highly flammable petroleum distillate (V.M. and P. naphtha) collected over a 130–160° C. boiling point range. When a small sample of these capsules is ignited in air, a steady flame is obtained for a longer period of time than when unencapsulated material of the same weight is ignited in air. Also with these microcapsules a popping noise is noted during burning which is indicative that capsules are actually exploding and releasing the naphtha fill as a vapor, which is then promptly ignited. These capsules rupture at approximately 250° C. when observed on a melting point block, which indicates great shell wall strength.

A very practical test of both shell wall strength and permeability is one where dye precursor containing capsules are slurried with a co-reactant for said precursor in a paper slurry and a paper is made from such slurry by conventional hand sheet procedures (where the paper is sheeted out on a hand sheet mold at about 50 p.s.i.). The sheet is then measured for brightness by use of a reflection meter equipped with a green filter. A reading on the resulting paper of below 76% reflected light indicates a high percentage of capsule ruptures due to inferior capsule formation, either because the capsules were too permeable or too weak, or a combination of both, rendering the capsules unsuitable for use as capsules in a self-contained impact paper.

Capsule size can be easily determined by use of a "Coulter" counter, a particle size measuring unit marketed by Coulter Electronics, Inc., Chicago, Ill., or microscopically either by the use of a microscope with an eyepiece micrometer calibrated to show actual particle size or by visual comparison of capsules with a size range of various standardized glass beads.

In general, the capsules of this invention display no special sensitivity to storage and can be stored for extended periods. Likewise, storage of aqueous slurries of capsule shows no observable detrimental effect over long periods.

The fill particles may carry sealing agents which form sealing materials which form liners separating the fill from the shell walls. For example, ethyl cellulose, when incorporated with a xylene fill, apparently forms a sealing layer between the xylene and the shell wall.

Dyes can be used to color the shell walls instead of being contained in the fill. Thus, to dye the normally generally transparent shell walls, one can slurry the microcapsules in aqueous dye solution. For example, addition of Rhodamine B to the reaction mixture imparts a reddish-violet fluorescent color to the shell walls.

In the specific examples following, the number of moles of reactants are given along with the weights used and operating procedures. Equivalent weight, when used, may be converted to molecular weight by multiplying the equivalent weight by the number of reacting groups present. The term "precondensate" is used synonymously with "prepolymer." Parts are by weight, unless otherwise specified.

EXAMPLE 1

A prepolymer solution is formed by heating a mixture of 488.5 grams (6.0 moles) 37% aqueous formaldehyde and 240 grams (4.0 moles) urea adjusted to pH 8.0 with triethanolamine for one hour at 70° C. This prepolymer is diluted with 1,000 grams of water, yielding a relatively stable solution for forming microcapsules.

Microcapsules containing oleic acid ($C_{17}H_{33}COOH$) are prepared by first adjusting to 5.0 the pH of one-tenth volume of the above prepolymer solution with 10% aqueous citric acid while agitating, adding 65 grams oleic acid at room temperature and further adjusting the pH to 3.5 with 10% citric acid, maintaining agitation sufficient to disperse the oleic acid in the aqueous system. The agitated mixture is heated and maintained at 40–45 C. After about one-half hour, shell formation is microscopically evident. The mixture thickens during 40 minutes at this elevated temperature, therefore 50 ml. of warm water is added. After three hours reaction time, cold water is added to bring the total volume to 600 ml. and one-half of the resulting slurry is filtered by gravity, yielding 48 grams of microcapsules after air drying. The remaining suspension is gravity filtered after standing 17 hours and air dried to yield 44 grams microcapsules. The microcapsules are free flowing and particulate with a size range of 75–150μ and a fill content of 64% oleic acid as determined by crushing and acetone extraction of a weighed sample.

A second one-tenth volume of the prepolymer solution is reacted in the presence of 80 grams toluene at a pH of 2.5 at room temperature (25° C.) with dilution by 50 ml. water at 50 minutes. After six hours the resulting capsular slurry was diluted with 600 ml. of water and filtered. Filtration and air drying yields 75 grams toluene microcapsules whose particle sizes range from 80–120μ and contain 71% toluene as determined by crushing the microcapsules and evaporating the released fill material.

EXAMPLE 2

The pH of 97.2 grams (1.2 moles) of 37% aqueous formaldehyde is adjusted to 8.0 with triethanolamine and combined with 48 grams (0.8 mole) of urea. The mixture is heated slowly on a hot plate with agitation until the urea dissolves, and 134 grams dibutyl phthalate tinted with Sudan IV red dye is added. The mixture is heated to 70° C., maintaining a pH of 8.0. Only slight thickening is noted. After one hour reaction at 70° C., 200 ml. hot water (55–60° C.) is added. The pH of the diluted mixture is adjusted to 3.8 with 10% citric acid solution in water and the reaction continued for ½ hour with noticeable slow thickening at which time an additional 100 ml. hot water is added. After 50 minutes additional reaction at 45–55° C., the major portion of the microcapsule slurry is poured on ice, gravity filtered, partially air dried, and vacuum dried (70° C./2 hr./25 in. vacuum) to give free flowing microcapsules.

Microcapsules thus produced (149 grams) analyze as 68% fill and 20–80μ particle size.

EXAMPLE 3

Prepolymer solution is formed by the reaction of 82 grams (1.36 moles) urea with 220 grams (2.72 moles) 37% aqueous formaldehyde for one hour at 70° C., adjusted to pH 8.0 with triethanolamine. After reaction, one-half of the precondensate is added to a mixture of 200 ml. water and 130 grams dibutyl phthalate containing 0.65 grams Sudan IV dye, stirring in a Waring Blendor. The mixture is stirred at high speed for five minutes and transferred to an 800 ml. beaker. Agitation necessary to maintain the dibutyl phthalate dye dispersed phase as 25–125μ droplets is contained during the reaction. The mixture is maintained at a temperature of 30–35° C. and the pH adjusted to 2.5 with formic acid to bring about formation of the urea-formaldehyde polymer shell and encapsulation of the dye-bearing dibutyl phthalate fill. The mixture is diluted with 100 ml. hot water at the end of 70 minutes reaction time to maintain fluidity and reacted for a total of 4 hours. The resulting microcapsule slurry is vacuum filtered, washed, and air dried. The dried microcapsules are screened to give a total of 159 grams microcapsules which screen as follows: >20 mesh=1.2%, 20–40 mesh=2.5%, 40–60 mesh=9.5%, 60–140 mesh=51.4%, and less than 140 mesh=41.7%. Microscopic comparison with size-graded glass beads shows a size range of 25–50μ for the <140 mesh size and 50–125μ for the 60–140 mesh size range. Fill analysis by extraction shows 60% fill.

Following the general procedure of this example a number of operating conditions were used in encapsulating a wide variety of oil liquid fill materials.

Thus, precondensate solutions were prepared from formaldehyde and urea in mole ratios of 1.5:1 to 2.0:1 and having about 20% solids content.

To such solutions were added a wide variety of fills, i.e. diethyl and dioctyl phthalate with various dyes, mineral spirits, pine oil, trichlorodiphenyl, paraffin wax, $C_8F_{16}O_6$ (a perfluorocyclic ether), tetrachloroethylene, carbon tetrachloride, toluene (alone and with dyes), isooctane, tetrachloroethylene, trichloropropane, "Piccolyte" S–25 and 115 (polyterpene resins marketed by Pennsylvania Industrial Chemicals Co.) diluted with toluene, gum rosins dissolved in toluene, pentaerythritol modified abietic acid, "Jasmine Bouquet" (a synthetic Jasmine odor base, marketed by Dodge and Olcott, Inc.), a polyglycol diacrylate marketed by Rohm and Haas as "X970," black shoe polish, and n-amyl alcohol, among others.

The resulting dispersions were acidified by the addition of acid to a pH in the range of 2.5 to 5 to produce capsules having from about 40 to 94% fill. Polymerization was carried out at temperatures in the range of 30° C. and 70° C. for a period ranging from 1.5 hours to 5 hours. The resulting capsules ranged in size from 20μ to 1500μ.

EXAMPLE 4

Microcapsules can be formed using a 100% solids commercially available aminoplast adhesive powder of the urea-formaldehyde type by dilution to the proper range followed by acid-catalyzed condensation to the water-insoluble state. "Urac 110" (American Cyanamid Company), a commercial 100% solids urea-formaldehyde adhesive powder, is utilized directly by dissolving 60 grams in 280 ml. water (17.6% solids), using 130 grams dibutyl phthalate as fill material with agitation and reacting at 35° C. at a pH of 2.5 (adjusted with formic acid) for a period of 2⅓ hours to yield 163.5 gram microcapsules. Crushing and acetone extraction of a 3 gram sample shows a fill content of 77.5%.

Similar aminoplast prepolymers, namely "Urac" 180 and 186, and "Parez" resin 608, all marketed by American Cyanamid, are available commercially in liquid, syrupy form containing upwards of 50% total solids and have also been used in the practice of this invention.

EXAMPLE 5

Prepolymer solution is prepared by the reaction of 194.4 grams (2.4 moles) 37% formaldehyde with 96 grams (1.6 moles) urea for one hour at 70° C. Dilution of the prepolymer with 400 ml. water provides a relatively stable solution of potential shell former which is utilized to prepare microcapsules of a reactive polyacid of the type used as an epoxy resin curative. The trimer ($C_{54}$) fatty acid as produced by Emery Industries under the product designation of Polymerized Fatty Acid 3055–S is formed from three $C_{18}$ fatty acid molecules, contains three carboxylic acid groups and has an average molecular weight of about 845. A solution of 80 grams Trimer Acid and 40 grams toluene to reduce viscosity is encapsulated as a dispersed phase in one-half of the above prepolymer. The prepolymer solution pH is adjusted to 5.0 with 20% citric acid prior to addition of the trimer acid-toluene solution at 35° C. The pH of the agitated dispersion is adjusted with 20% citric acid to 3.5 over a period of 18 minutes. Microcapsule wall formation of urea-formaldehyde polymer is evident after about 25 minutes of reaction. The pH is further reduced to 2.8 with 20% citric acid after 1⅓ hour of reaction. Thickening proceeds slowly until an additional 100 ml. hot water is added at about 2 hours reaction time. After 3¾ hours reaction, ice water is added to a total volume of 800 ml. The microcapsule slurry is filtered by gravity filtration and air dried. Recovered product, 130 grams, analyzes as 55% fill by crushing and extraction with acetone and comprises mainly microcapsules in the size range 80–100μ.

Using this same prepolymer, a reactive liquid polysulfide fill, "Thiokol LP-3" marketed by Thiokol Corporation, comprising, predominantly HS $(C_2H_4OC_2H_4OC_2H_4SS)_6C_2H_4OC_2H_4SH$, was encapsulated at a pH of 3.0. The objectionable odor of the polysulfide was substantially eliminated.

EXAMPLE 6

One-fourth of a prepolymer solution prepared by reaction of 220 grams (2.22 moles) 37% aqueous formaldehyde and 82 grams (1.36 moles) urea at a pH of 8.0 and temperature 70° C. for one hour is used for microcapsule formation nine days after solution preparation. This prepolymer solution is combined with 65 grams solid sulfur (Sublimed Sulfur—Merck and Co.) of 5–25 micron particle size and further diluted with 50 ml. water prior to reaction at 35° C. The pH is adjusted to 2.2 with 5% hydrochloric acid. The reaction mixture is agitated at a rate sufficient to disperse the solid sulfur particles in the aqueous urea-formaldehyde system. The microcapsule slurry is vacuum filtered after four hours of reaction, washed and air dried. A melting point determination on a portion of the 82 grams recovered (using a Fisher-Johns melting point apparatus) shows a rupture temperature range of 200–260° C. Unencapsulated sulfur melts at 110° C.

EXAMPLE 7

Guanidine hydrochloride (6.53 grams or 0.07 mole) is used to prepare a prepolymer solution by reacting for one hour at 70° C., with 110 grams (1.36 moles) 37% formaldehyde, and 36.9 grams (0.61 mole) urea, adjusted to p 8.0 with 10% aqueous sodium hydroxide. After addition to 200 ml. water, one-half of the prepolymer solution is used to form microcapsules containing dibutyl phthalate tinted with 0.5% Sudan IV dye. The four hour reaction after initial pH adjustment to 2.5 with 5% hydrochloric acid, yields 74 grams microcapsules from the initial 60 grams fill liquid.

EXAMPLE 8

A prepolymer is prepared by reacting 440 grams (5.44 moles) 37 percent aqueous formaldehyde with 31 grams (0.41 mole) thiourea and 139.6 grams (2.33 moles) urea for one hour at 70° C., adjusted to pH 8.5 with triethanolamine. This prepolymer is diluted with 800 grams water to provide the prepolymer for subsequent microcapsule formation reactions.

Microcapsules containing a xylene solution of tert-butyl sulfenyl dimethyl dithiocarbamate ($C_3H_9CSSCSNC_2H_6$: MGK Repellent '55, McLaughlin Gormley King Co.) are prepared by combining a solution of 2.4 grams of the above rodent repellent in 120 grams xylene with one-fourth of the prepolymer, agitating to maintain dispersion, adjusting pH to 2.5 with 18% aqueous hydrochloric acid and reacting at 30–35° C. for four hours. Fluidity is maintained by diluting with 100 gram portions of water at fifty minutes and at three and one-half hours. The resulting microcapsule slurry is vacuum filtered, washed and dried to yield 143 grams of free-flowing microcapsules with a size range of 25–50μ. The active fill material, tert-butyl-sulfenyl dimethyl dithiocarbamate is commonly used to repel roaches and rats from specific areas. Other capsules were made in accordance with this example with fills of Dow Corning "550 Silicone Fluid" of the type $(-SiR_2-O)_x$ where the R groups are methyl and phenyl, and with fills of cottonseed oil.

EXAMPLE 9

Illustrative of a non-amide type shell modification is the utilization of phenol in the initial prepolymer preparation by reacting 74 grams urea, 220 grams 37% formaldehyde and 12.8 grams phenol for one hour at 70° C. with 1.6 ml., 75% triethanolamine as catalyst. Upon completion of prepolymer formation it is diluted to a total volume of 600 ml. Encapsulation of 120 grams of dyed dibutyl phthalate utilizing 300 ml. of the prepared prepolymer yields 165 grams of free-flowing 50–100µ microcapsules. The dispersion of oil in prepolymer at 26° C. is made acid to a pH of about 2 with 3.8 ml. of approximately 9% hydrochloric acid. After 15 minutes of reaction the temperature is 30° C. and due to thickening the reaction mixture is diluted with 100 ml. water. In five minutes another 100 ml. of dilution water is added at which time the reaction mixture is heated. The reaction is continued for a total of four hours to a maximum temperature of 43° C. The resulting microcapsule slurry is filtered and the separated capsules washed with water and air dried. Observation of the resulting microcapsules on a melting point block shows exudation of fill in the range 250–300° C. with melting of the composite resin shell at 300° C.

EXAMPLE 10

A wide variety of agricultural chemicals are advantageously converted to the microcapsule structure by the process of this invention. The general method of microcapsule formation used for producing the products was as follows:

Precondensate is prepared by reacting a solution of 440 parts of 37% formaldehyde, 2.85 parts of 75% triethanolamine and 164 parts of urea for 1 hour at 70° C. After reaction, 880 parts of cool water are added to give a total amount of about 1,485 parts of prepolymer.

Encapsulation utilizing 330 ml. of prepolymer and 120 grams of fill for each compound set out in the table is run by adding the fill material and 3.4 ml. of 9% hydrochloric acid to provide a pH of 2 to 2.5 to the prepolymer with agitation at 25–30° C. After shell wall formation at 30–40° C. for four hours the products are worked up in a variety of methods. These are: (1) slurry filtration, washing and drying; (2) neutralization in slurry form to be retained in an aqueous slurry for wet application; (3) neutralization followed by filtration and drying.

The fills encapsulated were as follows: 2,4-dichlorophenoxyacetic acid-isooctyl ester; 2,4-dichlorophenoxyacetic acid-butyl ester; 2,4,5-trichlorophenoxy acetic acid-butyl ester; o,o - dimethyl - o - (1,2-dibromo-2,2-dichloroethyl) phosphate; 1,2,3,4,10,10-hexachloro-1, 4,4a,5,8,8a-hexahydro-1,4-endo exo 5,8-dimethaninaphthalene (as 80% solution in xylene); o,o-dimethyl dithiophosphate of diethyl mercapto succinate; pentachloronitro benzene (as 50% solution in xylene); 3-(3,4-dichlorophenyl)-1,1-dimethyl urea; 1,2-dibromo-3 chloropropane; N-trichloromethyl thiotetrahydrophthalimide (as 20% solution in toluene xylene blend).

Capsules of the 2,4-dichlorophenoxyacetic acid-isooctyl ester, a widely used herbicide, were evaluated by incorporation in the soil at the concentration noted in the table following. The soil is placed in 4" pots and pea (Laxton's Progress) seeds are planted. The pots are then placed at 32° C. and 75% R.H. and watered as necessary. In other pots, peas were planted in herbicide free soil, and in soil containing unencapsulated herbicide.

HERBICIDAL UTILIZATION

| Treatment of soil | Conc., p.p.m. | Results |
|---|---|---|
| None | | 100% emergence. |
| Isooctyl ester of 2-4D | 100 | 25% emergence, very slow. |
| Encapsulated isooctyl ester of 2 4D.[1] | 100 | No emergence. |

[1] 2,4-dichlorophenoxyacetic acid.

Thus, the encapsulated herbicide retained its effectiveness for the entire two weeks.

In a further study of encapsulated agricultural chemicals, a field in Kansas in an area known to be heavily infested with Root Knot nematodes was selected for testing. Randomized field areas in this field were picked and five plots used per treatment. Soil application is made by use of a soil treatment applicator. Injections into the soil of 1,2-dibromo-3-chloropropane ("Nemagon"), a nematocide of high volatility, in both encapsulated form and in unencapsulated form are made by use of a previously prepared template so that probes are uniformly spaced precisely 12 inches apart on a diamond-shaped design. The applicator probes a depth of 6 inches. Turnips are drilled into the treated area one week after soil treatment. After two months the plants are harvested and scored as to galls per plant. Results of two test treatments of 5 plots each are summarized below:

NEMATOCIDAL UTILIZATION

| Chemical | Dose | Crop | Root knot gals/ plant |
|---|---|---|---|
| Unencapsulated "Nemagon" | 50 lb./acre | Turnip | 3.8 |
| Encapsulated "Nemagon" | do | do | 0.2 |
| Control | | do | 3.8 |
| Unencapsulated "Nemagon" | 50 lb./acre | do | 11.8 |
| Encapsulated "Nemagon" | do | do | 2.1 |
| Control | | do | 14.3 |

The unencapsulated "Nemagon" appeared to be of little if any benefit in reducing root knot galls—there being little advantage of the unencapsulated "Nemagon" over control growth having no nematocide, whereas the encapsulated "Nemagon" apparently protected the plants against root knot gall for the entire growing cycle.

EXAMPLE 11

A urea-hydrazine-formaldehyde prepolymer solution is formed by reacting 39 grams (0.65 mole) urea, 1.1 gram (0.022 mole) hydrazine and 110 grams (1.36 moles) formaldehyde at 70° C. at a pH of 8.5 (20% NaOH solution used in adjustment) for one hour. After addition of 200 ml. water and cooling to 35° C. the encapsulation reaction is carried out by adding and dispersing 130 grams of fill material (trichlorodiphenyl) containing 0.65 gram Sudan IV red dye, lowering the pH to 2.5 with 5% hydrochloric acid, diluting with 50 ml. water at one hour, and reacting for a total of four hours at 35° C. yields 163 grams of free-flowing microcapsules. Microcapsules thus produced range in size from 75–150µ and contain 77% liquid fill.

EXAMPLE 12

Prepolymer is prepared by heating 440 grams 37% formaldehyde, 164 grams urea and 3.2 ml. 75% triethanolamine at 70° C. for one hour, followed by dilution with 800 ml. water. One-fourth volume of this diluted aqueous prepolymer is turbulently agitated so as to entrain air bubbles and then 3.4 ml. 9% hydrochloric acid and 5 grams of xylene are added at 30° C. After 15 minutes 100 ml. water is added at 35° C. Addition of 300 additional ml. of water is necessary during the first hour of reaction in order to maintain low viscosity as the air-filled microcapsules form. The agitation is continued for a total of four hours with a maximum temperature not above 40° C. After filtration, washing and drying 50 grams of 75–200 micron air-filled microcapsules with a dry volume of 700 cc. or an apparent density of 0.0715 gm./cc. are recovered.

EXAMPLE 13

A prepolymer solution is prepared by reaction of 220 grams (2.72 moles) 37 percent aqueous formaldehyde and 82 grams (1.36 moles) urea at a pH of 8.0 and temperature of 70° C. for one hour. One-half of this mixture is utilized to prepare microcapsules of petroleum V.M. and P. naphtha distillate (varnish makers and painters naphtha) after dilution with 400 ml. water. Aqueous prepolymer solution containing dispersed V.M. and P. naphtha (150 grams) is reacted at a pH of 2.5 (adjusted with formic acid) to form urea-formaldehyde polymer shell walls as follows: The reaction mixture at 30° C. is diluted with 100 ml. water after one hour of reaction. The remaining three hours of reaction at 35–40° C. yields 178 grams free-flowing particulate microcapsules after vacuum filtration and air drying. Analysis of a sample by crushing and volatilization of the fill material indicates a fill content of 69%. The strength of these microcapsule walls is noted by determination of fracture or rupture temperature on a conventional Fisher-Johns melting point apparatus. Although V.M. and P. naphtha is a petroleum fraction collected over a 100–130° C. boiling range, the microcapsules show no rupture to 220° C., slight rupture on advancement to 235° C., and complete rapid rupture at 250° C. This material is a conveniently used and easily stored fuel.

EXAMPLE 14

Microcapsules containing petroleum distillate (V.M. and P. Naptha) are prepared in a ten-gallon open-head stainless steel reactor fitted with a stainless steel cooling and heating coil and baffles and an air powered stirrer with a 7 inch paddle type stirring blade.

A prepolymer is prepared by reacting 17.6 pounds 37 percent formaldehyde, 1.24 pounds thiourea and 5.58 pounds urea for one hour at 70° C. The pH is adjusted to 8.5 with 75 percent aqueous thiethanolamine at 45° C. during the heat-up period to 70° C. which is attained 20 minutes after pH adjustment. After one hour at 70° C. the temperature is lowered by adding 32 pounds water to dilute the prepolymer to the desired level.

One-half of the prepolymer is combined with 12 pounds V.M. and P. naphtha and reacted at pH 2.5 (adjusted with 18 percent hydrochloric acid) and 30° C. for one hour and 35° C. for an additional three and one-half hours. Dilution with one gallon water at 50 minutes, ½ gallon water at 80 minutes and ½ gallon water at 90 minutes maintains fluidity. Vacuum filtration, washing and air drying yields 11¾ pounds of microcapsules of a size range from 50–125μ containing 70 percent fill.

EXAMPLE 15

A prepolymer solution is prepared by reacting 82 grams (1.36 moles) urea and 220 grams (2.72 moles) 37 percent aqueous formaldehyde at a pH of 8.0 (adjusted with triethanolamine) for one hour at 70° C., followed by dilution with 400 ml. water. One-half of this solution is used to encapsulate fusel oil acrylate containing a free radical polymerization catalyst.

The pH of the prepolymer solution is lowered to 5.0 with formic acid prior to addition of 130 grams fusel oil acrylate containing 0.65 gram dissolved azobis-(isobutyronitrile). The agitated system is adjusted to a pH of 2.5 with formic acid and reacted for 4 hours total, diluted by addition of 100 ml. water at the end of one hour reaction. The final product is cooled by addition of ice to a total volume of 1 liter, vacuum filtered and air dried. The resulting 158 grams of microcapsules (75–125μ) analyze as 66 percent extractible fill by crushing in a mortar and pestle and extracting with acetone.

By exposing to ultra-violet light, decomposition of the azobis-(isobutyronitrile) catalyst initiates rapid bulk polymerization of the fusel oil acrylate monomer inside the microcapsules. Polymerization is visually confirmed by crushing the microcapsules under a microscope, where the unpolymerized material flows as a fluid on microcapsule rupture while the polymerized counterpart does not flow but is a sticky adhesive on rupture. Other free radical initiators which decompose to form free radicals by thermal decomposition, or by photo decomposition, can be used, such as benzoyl peroxide, dicumyl peroxide, ditertiary butyl peroctoate, and others.

After microencapsulation, the polymerizable acrylates, like fusel oil acrylate, can be converted to polymer by decomposition of catalysts included therein by heat. Similarly, high energy actinic radiation such as ultraviolet light, gamma, beta and X-radiation, and the like, may be used to form the free radicals. Thus, adhesive-forming monomers which when polymerized do not readily disperse can be microencapsulated. Polymerizable monomers useful for producing adhesives are readily dispersible in aqueous media and are easily microencapsulated by the processes of this invention. After polymerizing, say, fusel oil acrylate, one has a viscous, sticky adhesive in microcapsule form, the microcapsules being free-flowing and non-tacky until broken by pressure. Other types of encapsulatable adhesives include heat seal adhesives, solvent-containing adhesives, and the like.

EXAMPLE 16

Microcapsules encapsulating epoxy resins are prepared as follows:

A prepolymer is prepared by reacting a mixture of 440 grams 37% formaldehyde, 164 grams urea and 3.2 ml. 75% triethanolamine for one hour at 70° C. followed by dilution with 800 ml. cold water.

The epoxy resin used has an epoxide equivalent of 175–205 and is a bis phenol-epichlorohydrin reaction product marketed under the trade name ERL 2795 by the Bakelite Company. Equal ¼ portions of the above prepolymer are used to encapsulate two 120 gram portions of this epoxy resin and the remaining ½ of the prepolymer is used to encapsulate a 240 gram portion of the same epoxy resin. Different agitation rates are used to achieve the final microcapsule sizes noted below. Polymerization is carried out in the usual manner, that is, agitation for a total of four hours in acid catalyzed dilute prepolymer at a temperature of 30–40° C., with addition of 3.8 ml. of approximately 9% hydrochloric acid for the 120 gram fill charges and 7.6 ml. of approximately 9% hydrochloric acid for the 240 gram fill charge to provide a pH of about 2. In all cases after microcapsule formation, the products are washed, filtered and dried yielding microcapsules having average diameters in the range 100–300μ and 50–200μ, respectively, for the 120 gram portions, and 20–50μ for the 240 gram portion.

EXAMPLE 17

A modified prepolymer solution is formed by reaction for one hour at 70° C. of a mixture of 97.2 grams (1.2 moles) 37% aqueous formaldehyde, 43.2 grams (0.72 mole) urea, and 6.9 grams (0.055 mole) cyanuramide (melamine) to which is added triethanolamine to adjust the pH to 8.0. The solution is diluted with 200 ml. water and divided into two equal portions, one of which is used to form microcapsules from 60 grams dioctyl phthalate, to which a trace of Sudan IV red dye was added as a tracer to aid in microscopic examination during the reaction. The shell formation reaction is run with agitation sufficient to disperse the dye-oil system in the aqueous system at 45–50° C., at a pH of 3.5, for a total of 2½ hours. The system is diluted with 100 ml. hot water at two hours to maintain fluidity. The resulting microcapsules are filtered, water washed, air dried, and heptane washed. A total of 74 grams capsular material is obtained in two portions by flotation of free shell material in the water washing step. The 32 gram fraction contains 50 percent or more capsules. The remaining 42 grams of free-flowing particulate microcapsules of 200–300μ size range analyzes for 82 percent fill by crushing a 3 gram sample in a mortar and pestle and extracting the soluble fill material with acetone.

EXAMPLE 18

Large scale production of capsules for use in selfimaging or marking papers was carried out as follows:
The capsule fill was composed of:

| Material | Lbs./100 |
|---|---|
| Charge: | |
| A ............ Cyclohexane ............................. | 64.5 |
| B ............ Diethyl phthalate ......................... | 15.7 |
| C ............ Tri-butyl phosphate ....................... | 14.3 |
| D ............ N,N'-bis(2-octanoyloxyethyl) dithiooxamide.. | 4.0 |
| E ............ N,N'-bis (dibenzyl)dithiooxamide .............. | 1.5 |

The materials are mixed in the order of their recitation above in a stainless steel kettle equipped with an agitator and heating jacket at about 100° F., charge A being first added, and the remainder of the charges being added thereafter. After the temperature of the batch reaches 100° F., continue agitation at this temperature for one hour.

The precondensate solution is composed of:

| Material | Lbs./100 |
|---|---|
| Charge: | |
| A ............................. Formalin ............ | 29.3 |
| B ............................. Triethanolamine .... | .18 |
| C ............................. Urea ................ | 11.10 |
| D ............................. Soft water .......... | 50.20 |
| E ............................. Salt (NaCl) ......... | 9.22 |

The formalin is 37–38% formaldehyde and is stabilized with 7% methanol. The formalin is first added to a large stainless steel kettle equipped with an agitator and heating jacket and the temperature control set at 160° F. then charges B and C are added in the order recited with continued agitation. After the batch reaches 160° F. it is reacted with continued agitation for 2½ hours, then the temperature control is reduced to 75° F. Next charges D and E are added and the precondensate solution is ready for use. The concentration (exclusive of charge E) is about 24% solids.

The precondensate solution and the fill are combined to make capsules in a 300 gallon kettle as follows:

| Ingredient | Lbs./100 | Total lbs. in kettle |
|---|---|---|
| Charge: | | |
| A ............ Precondensate solution ............ | 81.60 | 243.0 |
| B ............ Hydrochloric acid (12.5%) ........ | .18 | 5.4 |
| C ............ Fill ............................. | 16.75 | 512.0 |
| D ............ Hydrochloric acid (12.5%) ........ | .18 | 5.4 |
| E ............ Hydrochloric acid (12.5%) ........ | .20 | 6.0 |
| F ............ Caustic (50% NaOH) .............. | .12 | 3.6 |
| G ............ Soft water ...................... | .97 | 29.8 |

The precondensate solution, charge A, is pumped into a stainless steel kettle equipped with heating jacket and a high shear agitator with a 10″ turbine. The temperature is from 65° F. to 95° F. Charge B is added to neutralize the solution. When the temperature of the solution is within about 2° of the selected temperature in the 65–95° F. range, charge C is added and agitator speed adjusted to about 1150 r.p.m. Five minutes after agitator speed adjustment, charge D is added over a five minute period and then after a wait of 12 minutes, charge E is added over a 12 minute period to provide the dispersions with a pH of 2.2±.3. One hour after the addition of charge E, set temperature control to 140° F., and three hours after charge E addition, add charge F and pump the neutralized slurry into a storage tank for subsequent use. Charge G is added to rinse the kettle and is then pumped to the storage tank. The resultant capsules have an average particle size in the range of 12 to 20 microns.

To test the capsules for the requisite strength and permeability a group of four handsheets of paper is made. 635 ml. of bleached sulfite pulp (e.g. Gaspesia with a 90 brightness value) at 1.57% solids and 80° SR (Schopper-Riegler) is diluted with 1365 ml. soft water in preparation for making test handsheets. To this aqueous slurry is added in succession (1) 6 ml. of capsule slurry (25% capsules), (2) 4 ml. of 10% $NiSO_4 \cdot 6H_2O$ and (3) 8 ml. of 10% "Dresinate X" (sodium rosinate from Hercules Co.). A mix time of 2 minutes is used between each addition. (Dry parts=100–15–4–8). The nickel sulfate reacts with the sodium rosinate to form nickel rosinate, which is a co-reactant for the capsule containing dye precursor; upon reaction of these components, a bright deep blue to purple permanent image is formed.

400 ml. of the above slurry is diluted to 3300 ml. in a William's 8 x 8 in. handsheet mold and the sheet formed on a 100 mesh wire. The sheet is couched from the wire onto blotter stock and then is pressed between dry blotters at 50 p.s.i. for 5 minutes. The blotters are removed and the sheet is dried on a polished hot-can drier at 220° F. until dry (approximately 10 minutes).

This yields a handsheet of about 30 lbs. basis weight (3000 sq. ft. ream size). The sheet can be readily marked by machine key impact or stylus pressure which ruptures capsules and releases the contents for reaction with the nickel rosinate.

The sheets are tested by reading the background brightness of a stack of 4 sheets, to make sure that the reading is of the paper and is not influenced by the background of the surface on which the paper rests, with a "Photovolt" Reflection Meter equipped with a green filter, Model 610, marketed by Photovolt Corp. New York, N.Y. A value of 76% reflected light is the minimum acceptable value for use of the capsules in a paper furnish for making self-contained impact paper on a paper machine, which paper can be dried, wound, slit and stacked without undue smudging or adventitious marking. A value lower than 76% reflectance indicates weak or permeable capsules which has led to premature coloration of the handsheet by complexing of the dithiooxamide derivatives in the capsule fill, i.e., the dye precursor, with the nickel rosinate formed from the reaction of the nickel sulfate with the "Dresinate X." Urea-formaldehyde capsules made by the procedure of Macaulay Pat. No. 3,016,308 resulted in grossly discolored sheets.

Using substantially the same fill, precondensate and other materials as in the charges noted in the previous part of this example, but varying the pH of the polymerization, and running the polymerization in these varying pH ranges, with and without sodium chloride addition, capsules were made over a polymerization period of about 16 hours (because of the higher pH range, longer polymerization times are required). Handsheets of self-contained impact paper containing such capsules were then made as previously described in this example and the following results were obtained with the meter reflectance tests.

| Gms. of salt added to each 100 gms. of precondensate | pH | Polymerization cure temperature, ° C. | Percent reflectance |
|---|---|---|---|
| 0 | 4.5 | 55 | 79 |
| 0 | 5.0 | 55 | 79 |
| 10 | 4.5 | 55 | 73 |
| 10 | 5.0 | 55 | 63 |

It will be noted that with the salt addition capsules tough enough to withstand the rigors of the handsheet reflectance test for self-contained impact paper resulted even at a pH as high as 5, whereas with no salt addition to the precondensate, the resulting capsules yielded paper having reflectance values below the minimum acceptable reflectance for useful self-contained impact papers. Polymerization at a pH of 5.5 resulted in incomplete encapsulation of the fill material. It should be noted that even at a reflectance reading of 73, the paper has a decidedly blue cast to it, whereas at 63 the paper is quite disclored throughout.

EXAMPLE 19

A manifolding paper utilizing the capsules of the invention was made as follows:

A prepolymer was prepared as in Example 18, except that the final charge (the salt) was not added. The fill material was the same as that used in Example 18. The encapsulation dispersion was as follows:

| | Material | Lbs./100 |
|---|---|---|
| Charge: | | |
| A | Precondensate solution | 83.12 |
| B | Hydrochloric acid (12.5%) | .19 |
| C | Fill | 15.10 |
| D | Hydrochloric acid (12.15%) | .19 |
| E | Hydrochloric acid (12.5%) | .21 |
| F | Caustic (50% NaOH) | .13 |
| G | Soft water | 1.06 |

Charge A was added and the agitator started, then charge B was added. The temperature was adjusted to 80–90° F. and charge C was added. The agitator was set for high shear agitation and charge D was added over a five minute period. 30 minutes after charge D was added, charge E was added over a 30 minute period to adjust the pH of the system to 2.2 plus or minus .3. One hour after charge E was added, the temperature was raised to 105° F. and the polymerization mixture was maintained at this temperature for a further nine hours. After the nine hour period, charge F was added to neutralize the slurry and charge G was added to flush the tanks as the slurry was removed therefrom and drummed for storage and use.

28 parts of the resulting capsule slurry (25% capsules by weight) and 15 parts of 20% starch ("Penford Gum 380" from Pennick and Ford, Ltd.) was coated onto bond paper, a 30 lb. KS bond from Nekoosa Edwards Paper Company, at a coating weight of 4 to 5 pounds per 3000 square feet. The coating is applied to the back surface of the paper and when such a sheet is contacted with the surface of a sheet containing nickel rosinate, either as an impregnate therein or as a coating thereon, and the fill material from the capsules released by impact of a stylus, business machine key or the like, the receptor sheet will mark in the area in which the fill material is released.

EXAMPLE 20

A paper sheet coated with perfume was made as follows.

A prepolymer was prepared as in Example 18 and the fill was prepared from one part perfume oil and two parts diethyl phthalate.

Encapsulation proceeded as follows:

| | Materials | Grams or milliliters of materials used |
|---|---|---|
| Charge: | | |
| A | Prepolymer | 14,300 gms. |
| B | 9% hydrochloric acid | 26.2 ml. |
| C | Fill | 3,420 gms. |
| D | 9% hydrochloric acid | 43.7 ml. |
| E | 9% hydrochloric acid | 40.0 ml. |
| F | 10% sodium hydroxide | |

Charge A is added to the polymerization vessel and agitation is started and continued at 25° C. while charge B is added. Charge C is added and agitation is adjusted to produce the desired particle size, after which charge D is added. After a wait of about 30 minutes charge E is added continuously over a period of 30 minutes. One hour after the last acid addition has been completed, the pH of the system now being about 2.2, the temperature is raised to 40° C. and the reaction continued at this temperature over night. Thereafter, the capsule slurry is neutralized by the addition of sufficient sodium hydroxide, charge F., to bring the pH to 7.

A number of perfumes were encapsulated in the foregoing manner using the perfume oil concentrate for "My Sin," and "Arpege" both by Lanvin, the pine or apple blossom scent of Magnus, Mabee and Reynard, Inc., and "Toilet Water Concentrate Y" of Lanvin-Charles of the Ritz, Inc., which is the perfume base for the perfume "Yves St. Laurent."

These encapsulated perfumes were both carried within and coated on papers. Those carried within the paper were added to the paper slurry in the following proportions:

| Millimeters: | Material |
|---|---|
| 635 | Water. |
| 1365 | 1.57% bleached sulfite pulp. |
| 6 | 25% capsule slurry. |

The paper is sheeted out in the same maner as the paper is sheeted out in Example 18. The perfume essence is released by simply crushing the capsules.

The perfume capsules can be coated on a paper in strips or any other suitable pattern, as well as over the whole sheet. This has been found to be a particularly useful approach with coated papers, papers already having a protective coating of some sort on them. Thus, paper such as the 60 lb. PKG litho paper from Champion Paper Company coated with one side on polyethylene has had applied to the polyethylene coated side an encapsulated perfume coating. A perfume coating was composed of 22 grams of 30% polyvinyl-alcohol and 41 grams of the perfume capsule slurry containing about 33% by weight capsules. These ingredients are thoroughly mixed together and then coated onto the paper. There is little or no fragrance noticeable in the coated paper until the capsules are broken, as for example, by fingernail pressure, or the like, whereupon the fragrance becomes quite pronounced as the perfume essence is released.

In addition to their use in and on papers, capsules of this invention include a wide variety of useful combinations of otherwise incompatible materials.

Encapsulated liquids which otherwise would react with one another chemically or physically on contact can be admixed without premature reaction. Microcapsules can be uniformly distributed in an incompatible matrix, body or coating. Liquid filled microcapsules have low vapor loss, thereby eliminating certain toxicity hazards and preventing serious explosions, fires and other side effects associated with the free liquid materials. The liquid filled microcapsules of this invention can be processed, stored, packaged and shipped by simple means normally employed for particulate solids. Spoilage of encapsulated fills is reduced, such as spoilage arising from reactions with air, moisture, microorganisms, contaminants, etc. Thus, the useful life of the fill can be prolonged. Liquid fills can be regenerated in original free form by selective rupture of the microcapsule shell. Thus, mechanical crushing or equivalent other mechanical action can be employed.

Because of the susceptibility to decomposition of the polymer shells and because of the possibility of diffusion through the shell walls in certain environments, the capsules of this invention may be used for the slow release of their contents in the dispensing of insecticides, fungicides, fertilizing chemicals, and other substances were placed in such environments.

Particularly useful fields for encapsulated products are pharmaceuticals, cosmetics, food and feed and other materials generally associated with human consumption and use. Encapsulatable pharmaceutical products include diuretics, narcotics, lotions, steroids, hormones, hypnotics, anti-infectives, laxatives, anthelmintics, anti-dysenterics, chemotherapeutic agents, topical fungicides, antiseptics, antibiotics, veterinary medicines, and a variety of other drugs.

Light-sensitive materials can be encapsulated by the process of this invention.

Photographic chemicals of a non-aqueous nature can usefully be encapsulated as, for example, dyes, couplers, developing agents, fixers, washers, and the like.

Cleaners, and components of dentifrices and bleaches, etc., are encapsulatable. For example, dry cleaning fluids, such as perchloroethylene, are encapsulatable for later subsequent release as by rubbing on a piece of fabric where a spot exists.

Microcapsules of compounds useful for plant disease control provide a route to long term control of disease using compounds generally regarded to have only short term effectiveness. Some fungicidal compounds found previously to be phytotoxic can now be used without plant damage. Examples of encapsulatable fungicides are pentachloronitrobenzene, 2,3-dichloro-1,4-naphthoquinone and the like.

Similarly, herbicides, nematocides, insecticides, rodenticides and soil nutrients can be encapsulated with useful results.

Chemicals used for seed treatment are also readily encapsulated by the process of the invention. Such active compounds as pentachloronitrobenzene, N-trichloromethylthiotetrahydrophthalimide, tetrachloroquinone, etc., can be given longer lasting action and phytotoxicity may be reduced.

Other biological products can be encapsulated including: anthelmintics, lamphrey and slime control agents, algicides, swimming pool chemicals, miticides, acaracides, animal attractants, antiseptics, deodorants, disinfectants, mildewicides, and the like.

Elastomeric adhesives, dry film adhesives and adhesive tapes incorporating microcapsules are advantageously employed to provide adhesive products.

Other articles of manufacture utilizing the microcapsules of this invention include marking devices such as ribbons, inking pads, stencils, decals, and the like.

Sheet materials which are activated by heat and/or pressure can be fabricated. These sheet materials will be useful for cleaning purposes, duplicating or copying sheets, printing plates, and the like. In addition, the free-flowing discrete capsules can be employed for electrostatic printing and copying purposes.

Plastic coatings also can be formed in situ, for example, by the numerous combinations of monomers, catalysts, plasticizers or liquid polymers.

The dried or free-flowing microcapsules are especially suited for dusting type applications and the like, but can be incorporated into various fluid carrier media. Fluid carrier media can be liquids such as water, hydrocarbons, common organic solvents, and the like. These carrier fluids can contain along with the dispersed microcapsules various dissolved or dispersed materials for specific uses including resins, salts, preservatives, bacteriostatic agents, fertilizers, enzymes, adjuvants, and the like. Microcapsules can be ruptured by hydrolytic or like techniques whereby reaction occurs between the microcapsules and a fluid substantially on contact so that there will result an immediate or controllable release of fill into a liquid medium for further reaction or the like therein.

I claim:

1. A process of microencapsulating water-insoluble fill material within a shell of a water-insoluble non-thermoplastic synthetic resin of the aminoplast type which comprises (1) providing an aqueous solution of a water-soluble, low molecular weight aminoaldehyde precondensate comprising predominantly low molecular weight reaction products of urea and formaldehyde, the solution having a solids content of about 3% to 30% by weight of the total aqueous precondensate, (2) adding water-insoluble fill material to said aqueous precondensate solution in an amount in parts by weight of about one-tenth of a part to about ten parts of fill material for each part solids in said precondensate, said fill material inert toward reaction with said precondensate and its subsequent polymerization products, (3) dispersing said fill material as microscopically sized discrete particles in said solution while maintaining the system substantially free of carboxymethylcellulose and other wetting agents, and (4) while continuing to maintain said fill material in particulate form and maintaining the resultant dispersion at a temperature of about 10° C. to 50° C., adding acid thereto in just sufficient amount to provide a pH for the dispersion in the range of about 1.0 and 5.0 and thereby causing acid catalyzed polymerization of said precondensate, (5) continuing polymerization of said precondensate to a water-insoluble urea-formaldehyde polymer while maintaining said fill material as finely dispersed particles, and within a temperature range of about 20° C. to 90° C. for at least about one hour, whereupon an aqueous slurry of microcapsules is provided with said fill particles being encapsulated within tough water-insoluble urea-formaldehyde polymer shells.

2. The process of claim 1 wherein said aqueous slurry of microcapsules is neutralized immediately following polymerization.

3. The process of claim 1 wherein said precondensate contains 2 to 20% of a water soluble inorganic salt not reactive with the acid catalyst.

4. A process for microencapsulating a water-insoluble oily fill within shells of water-insoluble non-thermoplastic synthetic aminoplast resin which comprises (1) reacting a urea and formaldehyde in the presence of an alkaline catalyst at a temperature within the range of about 50° C. to 90° C. to form a urea aldehyde precondensate in which the solute is largely dimethylol urea, and controlling the dilution of the aqueous precondensate so that the solids content thereof is within the range of about 10 to 30 percent by weight of the total aqueous precondensae, (2) adding oily fill material to said aqueous precondensate in an amount within the range in parts by weight of about one-tenth to ten parts of oily fill material for each part solids content of said precondensate, and dispersing said oily fill in microscopically sized particles or droplets therein, (3) while maintaining the temperature of said aqueous precondensate within the range of about 15° to 30° C., and keeping it substantially free of carboxymethylcellulose and other wetting agents, continuously agitating the precondensate while adding acid thereto to reduce the pH of the aqueous system to less than about 3, but not less than about 1.5, to promote the acid catalyzed polymerization of said urea aldehyde as shell walls around said droplets of oily fill, and (4) continuing said polymerization within a temperature range of about 20° to 50° C. for about 2 to 12 hours.

5. A process of microencapsulating water insoluble oily droplets within water-insoluble urea formaldehyde shells impermeable to such oily material which comprises (1) providing an aqueous solution of a water-soluble, low molecular weight precondensate of urea and formaldehyde comprising predominantly dimethylol urea, the solids content of said precondensate being in the range of about 3 to 30% and the mole ratio of formaldehyde to urea being in the range of about 1.2:1 and 2.6:1, (2) adding oily fill to said aqueous precondensate solution, said oily fill material being substantially water-insoluble and inert toward reaction with said precondensate and its subsequent polymerization products under the polymerization conditions, then, (3) while maintaining the resulting system substantially free of carboxymethylcellulose and other wetting agents, subjecting the system to vigorous agitation to disperse said fill material as oily droplets in said precondensate solution, (4) while continuing vigorous agitation to maintain the dispersion of oil droplets in said precondensate, gradually adding acid to said dispersion in just sufficient amount to bring said dispersion within a pH range of about 1.5 to 3.0 and thereby causing polymerization of said precondensate, (5) continuing polymerization of said precondensate to a water-soluble urea formaldehyde polymer for at least about two hours while continuing vigorous agitation of said dispersion, whereupon said polymer condenses as tough, water-insoluble, continuous shells around said oil droplets and provides an aqueous slurry of microcapsules.

6. The process of claim 5 wherein said slurry is neutralized to prevent further polymerization.

7. A method of making microcapsules of an average size of from about 5 to 50 microns which comprises (1) providing an aqueous solution of a water-soluble, low molecular weight precondensate of urea and formaldehyde comprising predominantly urea and formaldehyde, said solution having a solids content of about 15% to 25% and being the reaction product of urea and formaldehyde reacted under alkaline conditions at a pH of about 7.5 to 11 in a temperature range of from 50° C. to 90° C. for a period ranging from about 15 minutes to about 3 hours, (2) adding a water-insoluble oily fill material to said aqueous precondensate in the amount of about 0.7 to 3 parts fill for each part precondensate solids, said oily fill being inert toward reaction with said precondensate and its subsequent polymerization products, (3) dispersing said fill material by rapid agitation into microscopically sized droplets in said precondensate solution in the substantial absence of carboxymethylcellulose and other emulsifying agents, and (4) maintaining said oily fill as dispersed droplets and in a temperature range of about 10° C. to 30° C. while controllably adding acid thereto in just sufficient amount to bring the dispersion in the pH range of about 1.5 to 3 thereby polymerizing said precondensate, (5) continuing polymerization of said precondensate at a temperature in the range of about 20° C. to 90° C. for at least about one hour whereupon said urea-formaldehyde has polymerized as water-insoluble thermoset shells around said oily fill dropets.

8. A process of microencapsulating water-insoluble fill material in a shell of water-insoluble urea-formaldehyde polymer, the process compriing
(a) dispersing and maintaining the fill material as microscopically sized discrete particles in an aqueous, water-soluble urea-formaldehyde precondensate solution substantially free of carboxymethylcellulose and other wetting agents, the solution having a solids content of about 3% to 30% by weight of the total aqueous precondensate and, the fill material being inert toward the precondensate and its subsequent polymerization products;
(b) polymerizing said precondensate by acid catalysis in a pH range of about 1 to 5, the polymerization being maintained in such pH range for at least about one hour while maintaining the fill material as finely dispersed particles in the solution, whereupon there is provided an aqeous slurry of microcapsules having fill particles encapsulated within tough water-insoluble urea-formaldehyde polymer shells.

9. Microcapsules comprising an organic liquid fill enclosed by a strong impermeable shell of urea-formaldehyde polymer which is substantially free of carboxymethylcellulose and other wetting agents, and produced by the process of claim 8.

References Cited

UNITED STATES PATENTS

| | | | |
|---|---|---|---|
| 3,016,308 | 1/1962 | Macaulay | 117—36.7 |
| 3,265,630 | 8/1966 | Jewsen | 252—316 |
| 3,137,631 | 6/1964 | Soloway | 167—83 |
| 2,797,201 | 6/1957 | Veatch | 260—25 |
| 3,173,878 | 3/1965 | Reyes | 250—316 |
| 3,074,845 | 1/1963 | Geary | 167—42 |

RICHARD D. LOVERING, Primary Examiner

U.S. Cl. X.R.

44—7; 71—3; 117—36.7, 36.8, 100; 162—162; 252—62.1, 90, 182, 426, 522; 260—2.5, 29.7, 47, 89.5; 424—32, 286, 350

UNITED STATES PATENT OFFICE
CERTIFICATE OF CORRECTION

Patent No. 3,516,941          Dated June 23, 1970

Inventor(s) Gale W. Matson

It is certified that error appears in the above-identified patent and that said Letters Patent are hereby corrected as shown below:

Column 5, line 16, "cycolhex-" should read -- cyclohex- --.

Column 10, line 9, cancel "HS"; line 10, the formula should read -- HS $(C_2H_4OC_2H_4OC_2H_4SS)_6C_2H_4OC_2H_4SH$, --; line 41, "p 8.0" should read -- pH 8.0 --.

Column 11, line 52, "5,8-dimethaninaphthalene" should read -- 5,8-dimethanonaphthalene --.

Column 12, line 22, "gals/" should read -- galls/ --.

Column 13, line 13, "in" should read -- is --.

Column 15, line 41, "243.0" should read -- 2430 --.

Column 16, line 70, "disclored" should read -- discolored --.

Column 17, line 52, "26.2 ml." should read -- 36.2 ml. --.

Column 18, line 5, "water" should read -- 1.57% bleached sulfite pulp --; line 6, "1.57% bleached sulfite pulp" should read -- water --; line 13, "strips" should read -- stripes --.

Column 19, line 19, "lamphrey" should read -- lamprey --; line 64, after "material" insert -- being --.

Column 20, line 64, "water-soluble" should read -- water-insoluble --.

SIGNED AND
SEALED
NOV 17 1970

(SEAL)
Attest:

Edward M. Fletcher, Jr.
Attesting Officer

WILLIAM E. SCHUYLER, JR.
Commissioner of Patents